(12) United States Patent
Sovic et al.

(10) Patent No.: US 11,001,214 B2
(45) Date of Patent: May 11, 2021

(54) BUMPER SYSTEM

(71) Applicant: Benteler Automobiltechnik GmbH

(72) Inventors: Odd Perry Sovic, Kolbu (NO);
Vincent Vilamosa, Gjovic (NO)

(73) Assignee: BENTELER AUTOMOBILTECHNIK GMBH, Paderborn (DE)

( * ) Notice: Subject to any disclaimer, the term of this patent is extended or adjusted under 35 U.S.C. 154(b) by 43 days.

(21) Appl. No.: 16/438,520

(22) Filed: Jun. 12, 2019

(65) Prior Publication Data
US 2019/0381960 A1 Dec. 19, 2019

(30) Foreign Application Priority Data

Jun. 13, 2018 (DE) .................. 10 2018 114 174.2

(51) Int. Cl.
*B60R 19/34* (2006.01)
*B60R 19/02* (2006.01)
*B60R 19/18* (2006.01)

(52) U.S. Cl.
CPC ............ *B60R 19/34* (2013.01); *B60R 19/023* (2013.01); *B60R 19/18* (2013.01)

(58) Field of Classification Search
CPC ....... B60R 19/02; B60R 19/023; B60R 19/26; B60R 19/34; B60R 19/36; B60R 2019/186; B60R 2019/1873
USPC ......................................... 293/133, 154, 155
See application file for complete search history.

(56) References Cited

U.S. PATENT DOCUMENTS

| | | | | |
|---|---|---|---|---|
| 5,314,229 A | * | 5/1994 | Matuzawa | B60R 19/34 188/377 |
| 6,481,690 B2 | * | 11/2002 | Kariatsumari | B60R 19/18 293/102 |
| 2005/0104393 A1 | * | 5/2005 | Haneda | B60R 19/26 293/133 |
| 2011/0012381 A1 | * | 1/2011 | Saito | B60R 19/34 293/133 |

FOREIGN PATENT DOCUMENTS

| | | |
|---|---|---|
| DE | 102009053861 | 5/2011 |
| JP | H11208393 | 8/1999 |
| WO | WO 2015/015067 | 2/2015 |

* cited by examiner

*Primary Examiner* — Dennis H Pedder
(74) *Attorney, Agent, or Firm* — Jacobson Holman PLLC

(57) ABSTRACT

A bumper system with a bumper beam and two crash boxes, and two intermediate elements, wherein the intermediate elements have a first wall and a second wall that are arranged such that, from the perspective of direction x, the first wall points toward the exterior of the vehicle and the second wall points toward the interior of the vehicle, wherein walls are linked to each other at their one end in direction y, and wherein the linked ends point toward the exterior of the vehicle. The walls continue to be connected to at least one first support wall. The intermediate elements are arranged in the bumper system so that, in the event of a force striking the bumper beam in direction x, the intermediate element is deformed first and thereafter the crash box assigned to the intermediate element is subsequently deformed.

16 Claims, 8 Drawing Sheets

BUMPER SYSTEM

BACKGROUND OF THE INVENTION

The invention relates to a bumper system.

So-called crash-management systems are of great significance in automobile manufacturing. The task of a crash-management system is to convert impact energy into deformation energy and thus to reduce the impact energy when a front collision is involved.

DE 10 2009 053 861 A1 shows a bumper system with one bumper beam and two crash boxes. The bumper beam has a curved shape and is attached directly to the crash boxes. In the event of a force striking in the direction of the length of the vehicle (lengthwise), i.e. perpendicular to the transverse bumper beam (crosswise), the force is shifted toward the crash boxes. The impact energy is introduced via the bumper beam to the crash box, which deforms and thus reduces the impact energy. The energy is reduced even further if no torque is introduced to the crash box and the crash box deforms evenly.

Depending on the type of vehicle, however, bumper beams are designed differently, particularly when they are given different curvatures. This means that the behavior of the bumper beam in an impact situation differs depending on the type of vehicle, and thus the crash boxes must be adapted to the respective vehicle type so that uniform deformation and thus optimal energy reduction are possible.

Furthermore, increasingly higher demands are placed on bumper systems so that the bumper system does not fail even with high degrees of penetration behavior.

Therefore, the problem of the invention is to provide a bumper system that can be adjusted with little effort for use in different vehicle types and that demonstrates improved collision behavior.

SUMMARY OF THE INVENTION

The invention relates to a bumper system with one bumper beam, two crash boxes, as well as two intermediate elements, wherein the intermediate elements have a first wall and a second wall that are arranged in such a way that, from the perspective of direction x, the first wall points toward the exterior of the vehicle and the second wall points toward the interior of the vehicle, wherein the walls are linked to each other at their one end in direction y, wherein the linked ends point toward the exterior of the vehicle, wherein the walls are further connected with at least one first support wall, wherein the intermediate elements are arranged in such a way that, in the event of a force striking on the bumper beam in direction x, the intermediate element is deformed first and thereafter the crash box allocated to the intermediate element is deformed subsequently.

In the process, direction x is understood to be the direction of the length the vehicle (lengthwise), while direction y refers to the cross direction of the vehicle (crosswise). Accordingly, direction z is understood to be the direction of the height of the vehicle.

The bumper beam is usually manufactured as an aluminum extrusion profile or a sheet-metal component and curved convexly in the direction of travel. It can also have one or multiple chambers that extend in the direction of the length of the bumper beam.

The crash boxes can also be manufactured from an aluminum extrusion profile or as a sheet-metal component. Depending on the requirement, a crash box can be implemented on the inside with one or multiple chambers that extend lengthwise. The chambers on the inside can be separated from each other by horizontal, vertical, and also diagonal inner walls.

The intermediate element consists of a first and a second wall, which are linked to each other at one end. Preferably the two walls are linked directly to each other. This can be done, for instance, with a bonded connection, but also with a single piece and in a materially uniform fashion. Together with the at least one support wall, a wedge-shaped structure is formed with an essentially triangular cross-section in direction z, wherein the linked ends point toward the exterior of the vehicle. The linked ends can be connected directly or via a short crosspiece or a radius, so that an acute or obtuse corner of a triangle is formed.

In a collision situation with another vehicle or even in a so-called pole test, the bumper beam is deformed and at least shifts section by section in direction x toward the interior of the vehicle. Thus the intermediate element is deformed. The two walls move toward each other and at least one support wall folds. If the deformation of the intermediate element is complete or almost complete, then the residual impact energy is reduced by the deformation of the crash boxes.

While in the prior art any energy must be absorbed by the crash boxes, in this invention, the entire process of converting impact energy into deformation energy is divided into two steps. A first amount of energy is reduced by deformation of the intermediate element; a second amount of energy is reduced by the deformation of the crash box.

The intermediate element can be partially or completely deformed.

Because, depending on the vehicle type, bumper beams usually have different geometries, the energy absorption behavior varies from vehicle type to vehicle type immediately after the start of the collision. The bumper beams bend and are deformed in different ways. Later in the course of the collision process, the bumper beam still only shifts in the direction opposite of travel, thus resulting in a corresponding deformation of the crash box. This can be accounted for by an adapted design of the intermediate elements. The first and second wall of the intermediate elements are arranged in such a way that energy absorption is optimized at the beginning of the collision process, depending on the vehicle type. The intermediate element can be adjusted to the geometry and/or curvature of the bumper beam. Different load levels or load paths can also be considered. The ramification of this is that the crash box no longer needs to be adapted to the respective vehicle type. This means that a complete crash box can be used for a large number of vehicle types, or at least identical extrusion or sheet-metal profiles can be used as a basis for production. This makes design and production more efficient.

It is always essential that the intermediate elements be designed and arranged in such a way that, after their complete deformation, the crash boxes are deformed as uniformly as possible and without additional, penetrating torque in order to enable optimal energy absorption. In the case of a pole test, the bumper beam bends in the middle and shifts toward the interior of the vehicle. At the same time, the outer ends of the bumper beam rotate toward the inside, such that, without the intermediate element, a torque normally affects the crash boxes and energy reduction is worsened by unfavorable folding behavior.

By using an intermediate element according to the invention, the torque generated by the turning of the outer ends of the bumper beam is absorbed, while the crash boxes remain largely untouched. If only the bumper beam shifts, then the crash boxes are deformed, wherein this occurs largely without introducing torque. Thus the crash boxes are deformed preferably such that they are folded in direction x.

In addition, the crash box can be equipped with recesses, corrugations, and the like to further optimize and/or control deformation behavior.

The expansion of the intermediate element in direction z normally depends on the dimensions of the crash box. However, the intermediate element can also be extended in a special embodiment in direction z, if several crash-management levels are to be connected. In the process, the intermediate element serves as support for a bumper beam at least for one additional crash-management level.

The crash boxes preferably have a wall thickness of 1.8 millimeters to 4 millimeters. The individual outer and/or interior walls of the crash box can have different wall thicknesses.

The crash boxes preferably have a wall thickness of 2 millimeters to 6 millimeters. The individual walls and/or support walls of the crash box can have different wall thicknesses.

A special embodiment of the invention provides that the first wall with a y-z plane involves an angle $\alpha_1$ from 0° to 20°, preferably 0° to 15°, particularly preferably 0° to 10°.

Another special embodiment of the invention provides that the second wall with a y-z plane involves an angle $\alpha_2$ from 0° to 20°, preferably 0° to 15°, particularly preferably 0° to 10°.

In another embodiment of the invention, the first and second wall involves an angle β between 0° and 45°, preferably 0° and 30°, particularly preferably 0° and 20°, extremely preferably 0° and 15°, most preferably 0° and 10°.

The position of the walls is dependent on the geometry of the bumper beam and crash box, on one hand, and on the penetration behavior of the bumper beam toward the interior of the vehicle, on the other hand.

During a collision, such as in a pole test, the bumper beam deforms and bends in the middle. At that time, the end areas of the bumper beam are shifted in a turning motion toward the interior of the vehicle.

Due to the movement of the bumper beam, the first wall of the intermediate element is shifted toward the second wall. The first support wall and the second support wall fold. During the deformation of the intermediate element, the crash box remains in its original form. It contributes to the energy reduction through its own deformation in the subsequent process. The design of the intermediate element and the arrangement of the walls, also relative to one another, contribute to the motion of the bumper beam being transmitted to the deformation of the intermediate element without touching the crash box.

Only after the intermediate elements are partially or completely deformed does the crash box then fold in direction x and thus further impact energy is reduced. In doing so, no torque is introduced to the crash box, so that the crash box folds evenly and the maximum possible deformation work can performed.

At the same time, it is ensured that the support walls have enough room to be folded and, at the end of deformation, enough room is left to absorb the folded walls.

A preferred variant of the invention provides that the intermediate elements are arranged between the bumper beam and the crash boxes.

Particularly preferably, the first wall is linked to the bumper beam and the second wall is linked to the crash box. This can be done with a bonded connection, for example, by welding technology, but also by bolts, screws, and the like or by any further linking method. A combination of linking methods is also possible.

In the embodiment variant with the intermediate element between the bumper beam and crash box, an area to take in a tow hook can also be integrated into the intermediate element.

The geometry of the intermediate elements and especially the first and second walls depend on the design of the bumper beam and crash box as well as on the circumstances, in the event of impact.

In particular, the first wall is designed to adapt to the external contour of the adjacent wall of the bumper beam. The first wall is adapted to the curvature of the bumper beam and comes as close as possible with it over the entire surface in the system in order to enable optimal energy transmission. Corrugations, recesses, extractions, and other embodiments of the bumper beam can also be taken into consideration.

In particular, this can also mean that the intermediate element comprises point-shaped, line-shaped or planar joining zones, which are adapted to the adjacent wall of the bumper beam, and the first wall of the intermediate element and the adjacent wall of the bumper beam are spaced in an area between these joining zones.

In this embodiment form, the crash box can have a beveled end in the direction of travel. The surface sloping with the y-z plane involves angle $a_2$, like the second wall of the intermediate element.

Another preferred variant provide that the intermediate elements are arranged between the crash boxes and the back plate allocated to the crash boxes.

Preferably the first wall is linked to the crash box and the second wall is linked to the back plate. The linking methods are the same as the first variant.

A particularly preferred embodiment of the invention provides that the first wall is linked to the crash box and the intermediate element is configured in a single piece and materially uniform with the back plate. This is possible, for example, if the intermediate element is designed as an extrusion profile. Because of this embodiment, the production of a bumper system is further simplified, because additional joining steps can be avoided.

In particular, preferably the second wall is formed by the back plate. This represents an additional functional integration. In addition, production is simplified by reducing the number of joining steps.

Another embodiment of the invention provides that the end of the crash box adjacent to the intermediate element is adapted to the adjacent wall of the intermediate element, so that the crash box and intermediate element are completely in the system. For example, the adaptation can occur by the fact that the adjacent end of the crash box is beveled so that the edge of the end runs parallel to the first or second wall of the intermediate element. The crash box can then be arranged directly on the intermediate element and linked to it. Both components are then in the complete system, which can, but does not necessarily, mean that the system covers the entire surface. Depending on the configuration of the intermediate elements, the adjustment can also provide that flanges or other linking elements are formed out of the end of the crash box. The complete system improves load transfer between the components.

The beveled end of the crash box, which comes into the system with the first or second wall of the intermediate element, also serves to create room to absorb the deformed intermediate element, so that its first wall is positioned almost parallel to the y-z plane after deformation of the intermediate element. This also makes it possible for the crash box to be uniformly deformed when more load is introduced.

Another embodiment of the invention provides that the first support wall connects the free ends of the first and the second wall with each other. This makes maximum energy absorption possible through the first support wall because the first support wall thus has a maximum length. In the process, the support wall does not need to be arranged at the end of the walls, but a small edge of the first and/or second wall can jut out, if it is appropriate for the design or for manufacturing.

Furthermore, preferably at least one second support wall is arranged between the first and second wall. By arranging a second or even a third or more support walls, the deformation behavior of the intermediate element and the energy absorption can be adapted to the respective application or geometry of the crash box. Absorption of various loads can be depicted by the number of different loads.

It can also be provided that at least one support wall has a curvature. Both the convex and the concave side of the support wall can point toward the exterior of the vehicle. The curvature of the support wall or walls influences the deformation behavior. The curvature specifies the direction in which the support walls are folded, namely by having the concave wall sections of a support wall move toward each other.

Furthermore, preferably the intermediate elements are arranged in such a way that support walls are aligned with the exterior walls and/or interior walls of the crash box to form a continuous load path. This measure further improves the energy absorption capability of the bumper system. A crash box can be equipped with only one chamber, but also with several chambers extending lengthwise. These chambers are separated from each other by internal walls. If the support walls of the intermediate elements and the walls of the crash box are aligned with each other and thus a continuous load path is formed, energy can also be introduced optimally to the vehicle structure.

Preferably the intermediate element is an aluminum extrudate. Particularly preferably, the extrusion direction is parallel to the vehicle's vertical direction. The embodiment of the intermediate elements as aluminum extrusion profiles can generate varied geometries in a simple way. No forming and joining steps are necessary to produce the intermediate element.

Preferably the intermediate element is mechanically processed and/or reinforced locally. The deformation behavior can be adjusted to the application by inserting corrugations, recesses, and/or deposits.

It is also advantageous if the intermediate element has fastening elements, especially flanges. Particularly in an embodiment as aluminum extrudate, a fastening element can be formed out of the intermediate element and, for instance, equipped with holes. This is advantageous if the intermediate element consists of a different material than the other components. Thus, a welded connection between a bumper beam made of steel and an intermediate element made of aluminum is quite difficult to realize, such that a form and/or force-locking connection is preferred.

In another embodiment of the invention, the bumper beam consists of a 6,000 or 7,000 aluminum alloy, and the intermediate elements and the crash boxes consist of comparatively softer material. Intermediate elements and crash boxes can also consist of an aluminum material. This material can either be heat-treated and therefore softer, or it can be a softer alloy.

The material for the bumper beam can also be artificially aged.

Preferably the bumper beam has a yield of Rp0.2 greater than 250 megapascals. Because of this embodiment of the bumper system, a relatively stiff bumper beam and comparatively softer intermediate elements and crash boxes are obtained, so that preferably the latter take over the deformation work and can further improve the behavior in an impact situation.

Finally, an advantageous embodiment of the invention provides that the intermediate elements have a higher capacity for deformation than the crash boxes.

The deformability of the intermediate elements and crash boxes is influenced by the strength of the materials, the thickness of the walls, and the number of support or interior walls. In order that the intermediate elements have a greater deformability than the crash boxes, the wall thickness and/or strength and/or number of support walls of the intermediate element, in particular, are smaller than in the crash box.

With the same number of support or interior walls, the wall thickness in the intermediate elements, in particular, is approximately 10 percent smaller than the crash boxes.

DESCRIPTION OF THE DRAWINGS

Additional embodiments and features are the subject matter of the following drawings. The same reference numbers also describe equivalent or identical features or components.

DETAILED DESCRIPTION OF THE INVENTION

Figure 1:
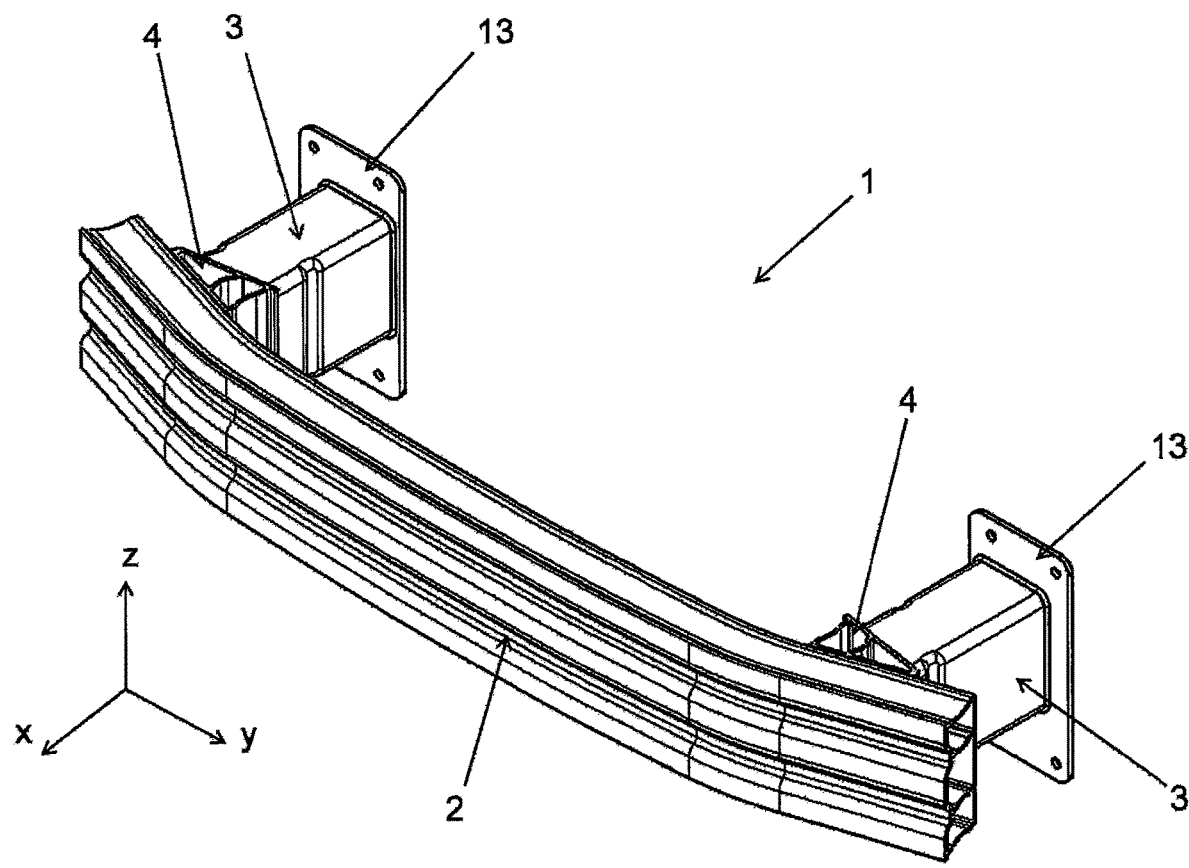
FIG. 1 shows a BUMPER SYSTEM according to the invention.

FIG. 1 shows a bumper system 1 with a bumper beam 2 and two crash boxes 3, as well as two intermediate elements 4, wherein the two intermediate elements 4 have a first wall 5 and a second wall 6 which are arranged in such a way that, from the perspective of direction x, the first wall 5 points toward the exterior of the vehicle and the second wall 6 points toward the interior of the vehicle, wherein walls 5, 6 are linked to each other at their one end 7, 8 in direction y, wherein the linked ends 7, 8 point toward the exterior of the vehicle, wherein the walls are further connected with at least one first support wall 9, wherein the intermediate elements 4 are arranged in bumper system 1 in such a way that in the event of a force striking bumper beam 2 in direction x, intermediate element 4 is deformed first and, after its complete deformation, crash box 3 allocated to intermediate 4 is deformed subsequently.

Bumper beam 2 is designed like crash boxes 3 as an aluminum extrusion profile. Bumper beam 2 has a curved geometry, which is replicated by the first wall 5 of intermediate elements 4, so that the first wall 5 comes into the system over its entire surface with bumper beam 2. An allocated crash box 3 is linked to the intermediate elements 4. Bumper system 1 also has back plates 13 which are mounted on crash boxes 3 and which serve to connect bumper system 1 to the longitudinal beam of the chassis, which is not shown.

Figure 2:
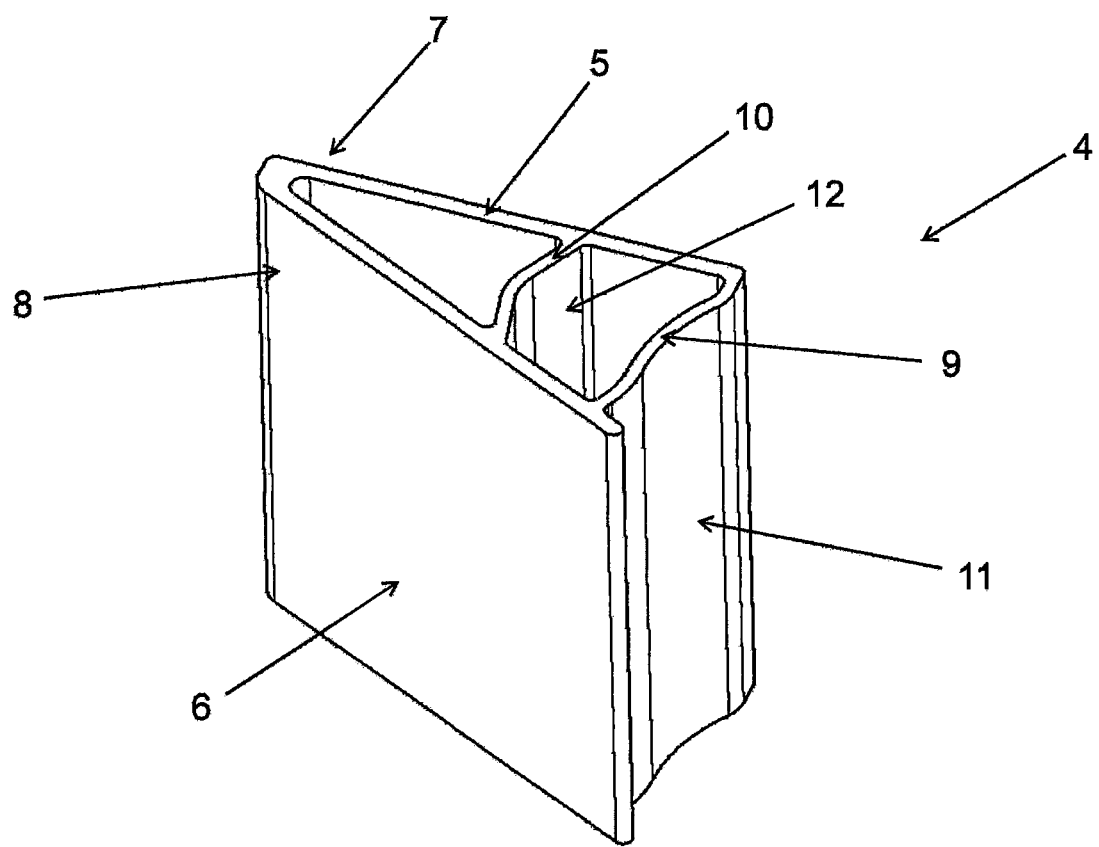
FIG. 2 shows an intermediate element.

FIG. 2 shows an intermediate element 4 designed as aluminum extrudate in isolation. In addition to the first support wall 9 connecting to the free ends, a second support wall 10 is still present, which stiffens the intermediate element 4. It can be seen that the first support wall 9 does not connect onto the outermost edge of wall 6.

The curvature of the first support wall 9 and the curvature of the second support wall 10 are also visible. The convex sides of the first and second support wall 9, 10 point toward the direction of the exterior of the vehicle. If the intermediate element 4 is deformed in the impact, the first wall 5 and the second wall 6 move toward each other. The first support wall 9 and the second support wall 10 are folded and the impact energy is eliminated. The folding of the support walls 9, 10 should always be done in the same reproducible way as much as possible, so that the material of the support walls 9, 10 is located, after deformation, in the space provided for this. The curvature is provided in order to obtain this intended folding behavior. In the event of a force striking the first wall 5, as is usually the case in an impact situation, the force is moved to the second wall 6. Due to the curvature, the concave sides 11, 12 of the support walls 9, 10 also move toward each other. The support walls 9, 10 then fold inside the intermediate element 4 and no material protrudes from intermediate element 4.

Figure 3:
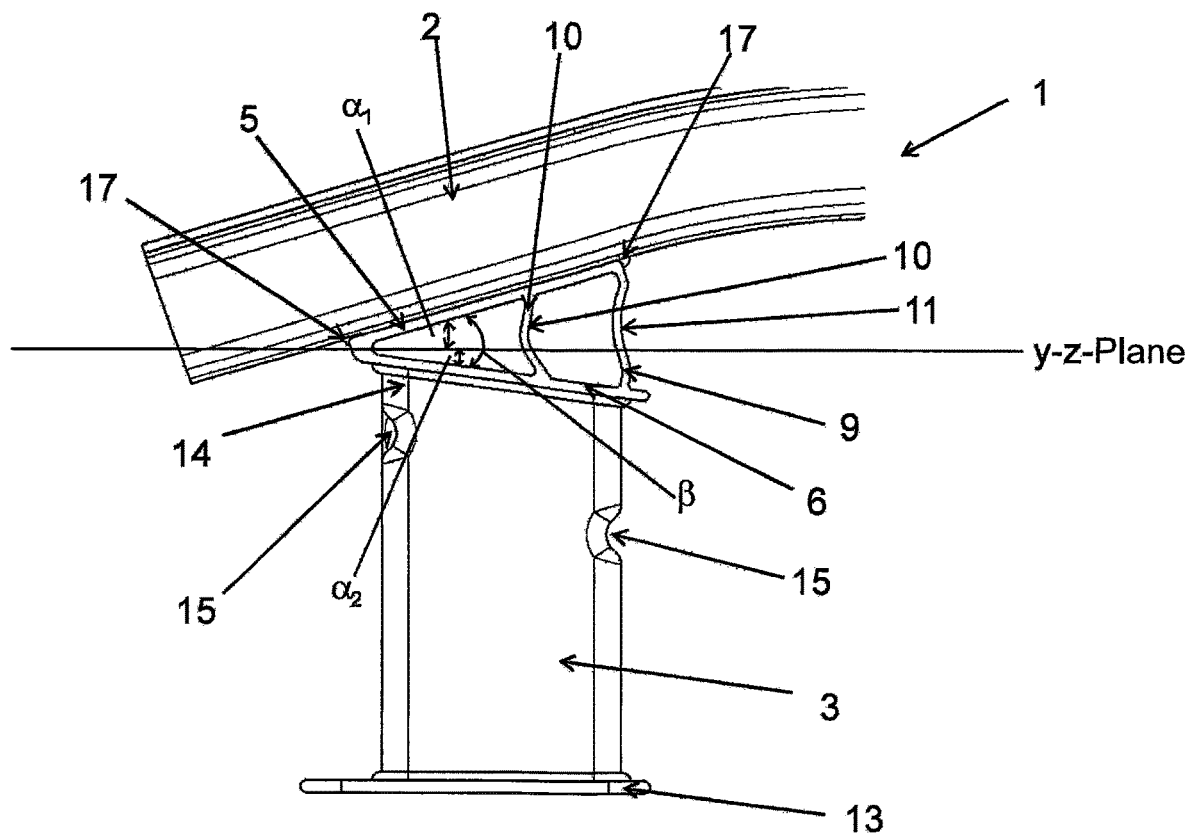
FIG. 3 shows a section of the BUMPER SYSTEM, top view.

FIG. 3 shows a section of the bumper system 1 from a top view. It can be seen here that the first and the second wall 5, 6 with the y-z plane each involve an angle $\alpha_1$, $\alpha_2$ from 0° to 20°, preferably 0° to 15°, particularly preferably 0° to 10°.

The first and second walls 5, 6 involve an angle $\beta$ from 0° to 45°, preferably 0° and 30°, particularly preferably 0° and 20°, extremely preferably 0° and 15°, most preferably 0° and 10°.

In this embodiment form, the crash box 3 comprises a beveled first end 14 in the direction of travel, which is adapted to the shape of the second wall 6. The surface of beveled end 14 sloping with the y-z plane involves the same angle a, like second wall 6 of the intermediate element 4.

Thus a crash box 3 that is identical in its basic form can be used for various concepts of a bumper system 1 which differ from one another in terms of design. The crash box 3 is adapted to the respective design only by processing end 14. This simplifies production tremendously.

In order to optimize the folding behavior of the crash box 3 further, the crash box 3 has corrugations 15 which can be provided in relation to the application.

The intermediate element 4 is linked to the bumper beam 2 via welded connections 17.

Figure 4A:
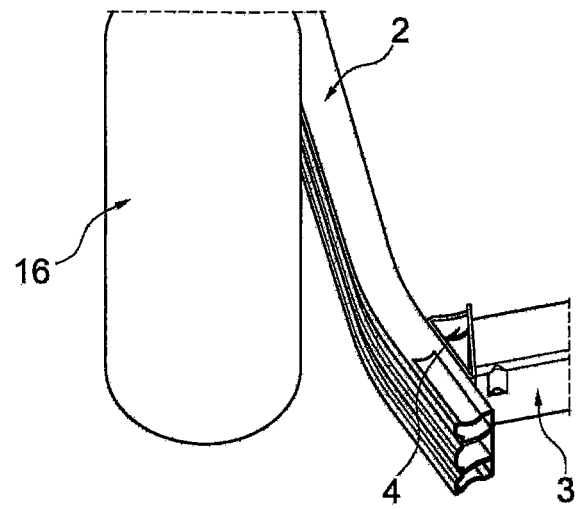
FIG. 4. consists of FIGS. 4A and 4B which shows the BUMPER SYSTEM during an impact situation.
Figure 4B:
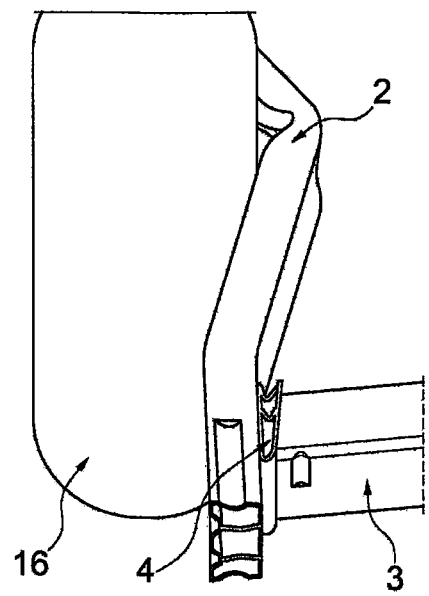

FIGS. 4A and 4B show the sequence of an impact situation. The bumper system 1 strikes an obstacle 16. The bumper beam 2 deforms; it bends in the middle and moves in toward the interior of the vehicle section by section. Due to the motion of bumper beam 2, the first wall 5 of intermediate element 4 shifts toward the second wall 6. The first support wall 9 and the second support 10 wall fold. During deformation of the intermediate element 4, the crash box 3 remains in its original form. It contributes to the energy reduction through its own deformation in the subsequent process. In the process, the crash box 3 folds in direction x and thus impact energy is reduced. No torque is introduced to the crash box 3, so that the crash box 3 folds evenly and the maximum possible deformation work can be performed.

The bumper beam 2 consists of a relatively hard material, a 6,000 or 7,000 aluminum alloy. By contrast, the intermediate elements 4 and crash boxes 3 are made of a softer aluminum alloy. This means that the bumper beam 2 remains relatively stable in the event of impact and deformation work is performed preferably by means of the intermediate element 4 and the crash boxes 3.

FIGS. 5 to 8 schematically show further embodiments of the bumper system according to the invention from a top view and perspectively with different embodiments and arrangements of the intermediate element 4.

Figure 5A:
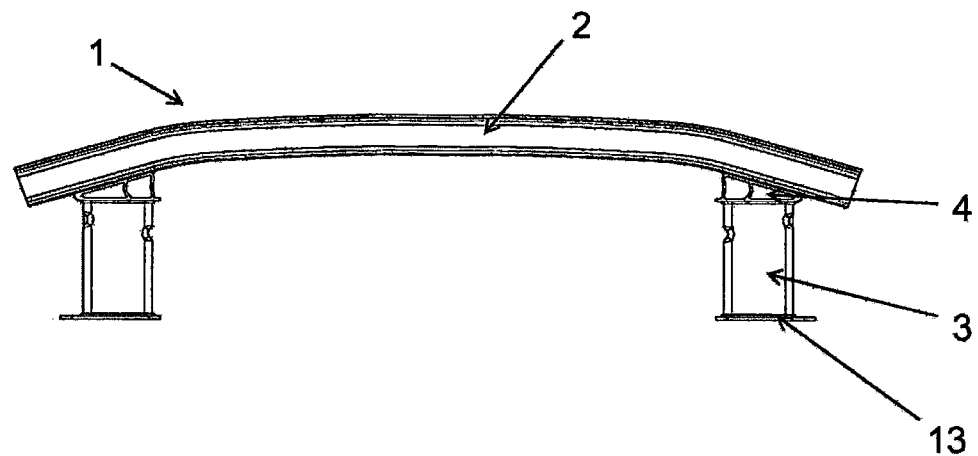
FIG. 5 consists of FIGS. 5A and 5B which shows a top view and perspective view of the BUMPER SYSTEM.
Figure 5B:
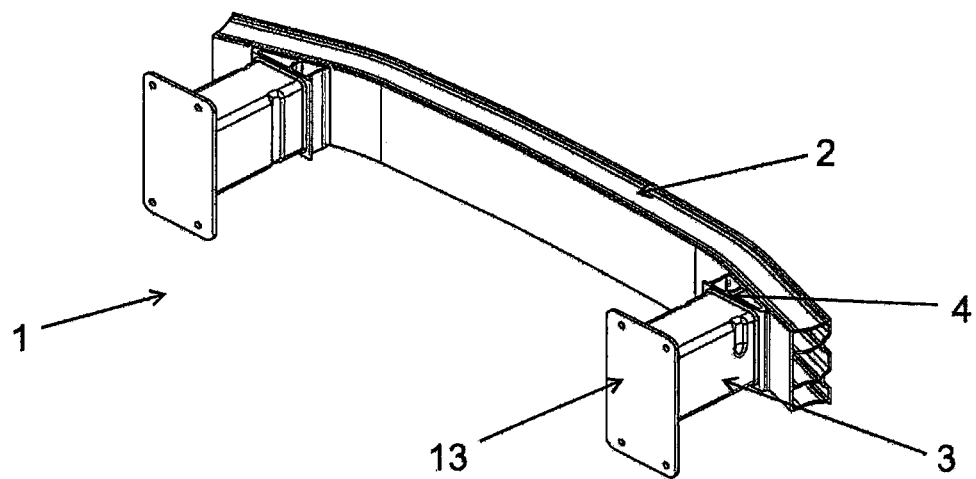

In FIGS. 5A and 5B, the intermediate element 4 is arranged between the bumper beam 2 and the crash box 3. Linked ends 7, 8 of the first and second walls 5, 6 are connected directly to each other. The second wall 6 of the intermediate element 4 involves an angle $\alpha_2$ of 0° with the y-z plane.

Figure 6A:
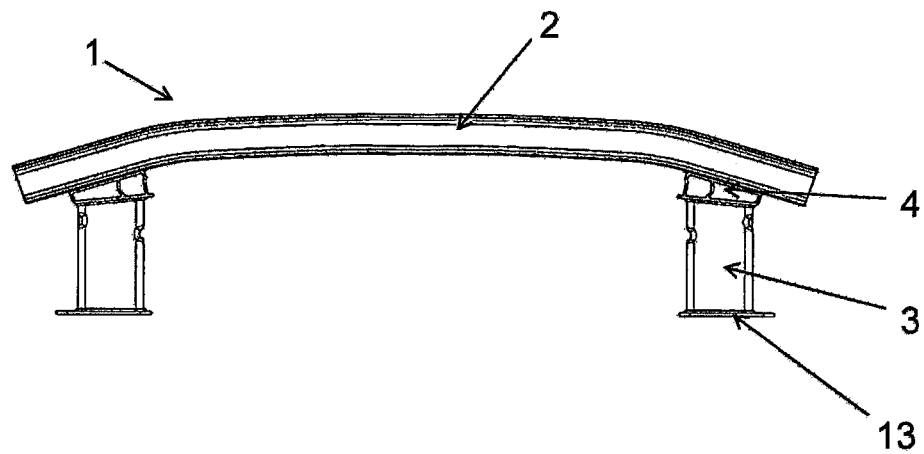
FIG. 6 consists of FIGS. 6A and 6B which shows an embodiment of the BUMPER SYSTEM by way of a perspective view and top view.
Figure 6B:
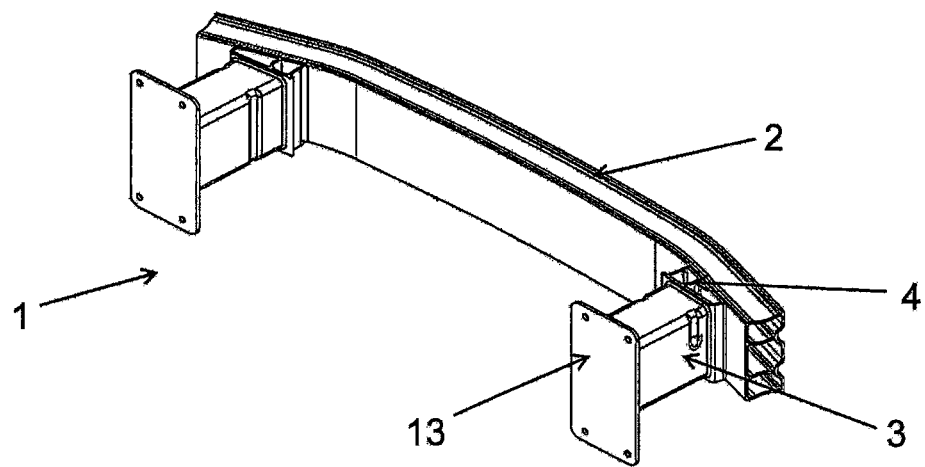

FIGS. 6A and 6B show an embodiment of the intermediate element 4 whose linked ends 7, 8 form an obtuse corner of the triangle, which is formed by the cross-section of the intermediate element in direction z. The intermediate element 4 is rather wedge-shaped.

Figure 7A:
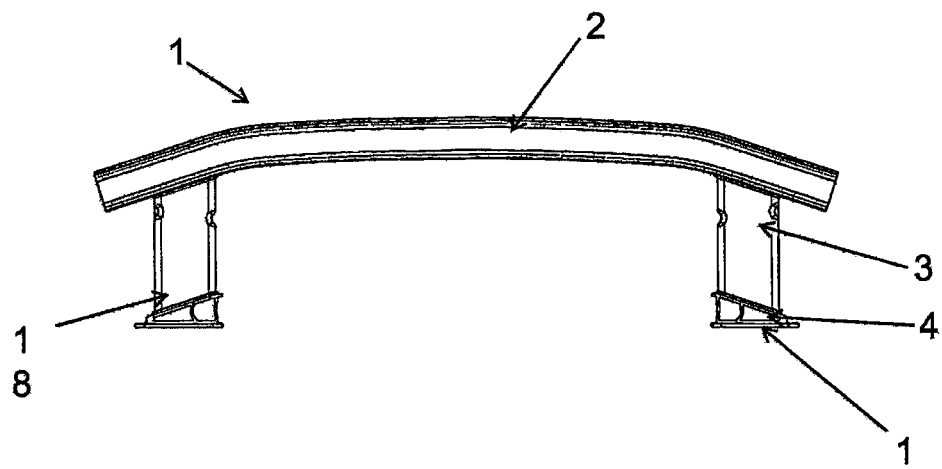
FIG. 7 consists of FIGS. 7A and 7B which shows another embodiment of the BUMPER SYSTEM by way of a perspective view and top plan view.
Figure 7B:
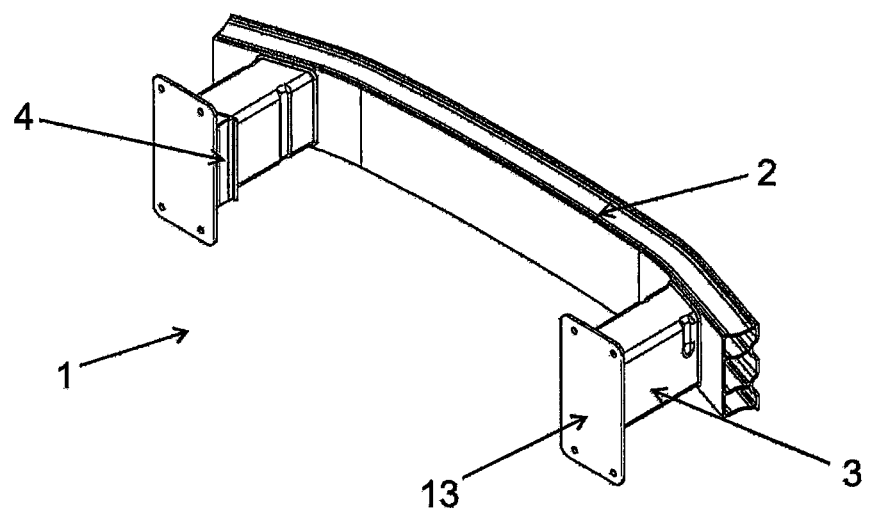

FIGS. 7A and 7B show a design of bumper system 1 in which the intermediate element 4 is arranged between the crash box 3 and the back plate 13. The second end 18 of the crash box 3 is beveled to be adapted to intermediate element 4. Thus the crash box 3 and the first wall 5 of the intermediate element 4 are also completely in the system, so that the load exerted on bumper system 1 is optimally transmitted.

Figure 8A:
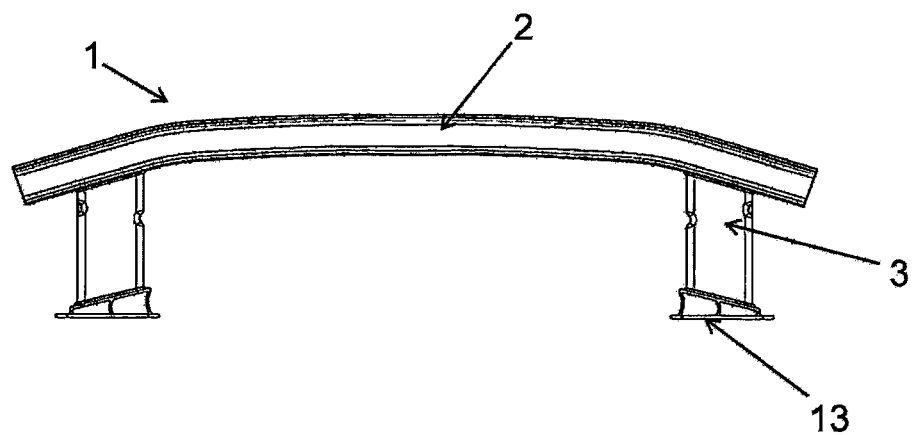
FIG. 8 consists of FIGS. 8A and 8B which shows another embodiment by way of a perspective and top plan view.
Figure 8B:
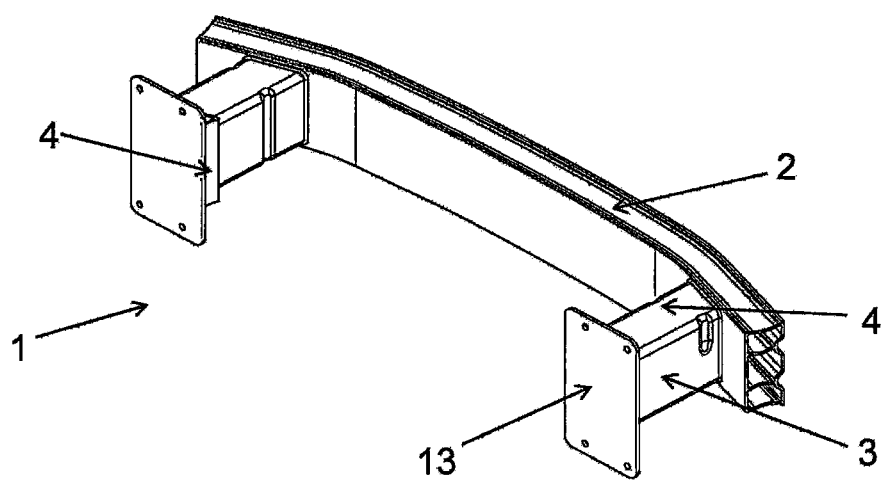

In FIGS. 8A and 8B, the intermediate element 4 is embodied in a single piece and materially uniform with back plate 13. Such an intermediate element 4 can be produced together with the back plate 13 in an extrusion process. In addition, a linking step is not applicable to both components, which simplifies the assembly of bumper system 1.

REFERENCE NUMBERS

1 Bumper system
2 Bumper beam
3 Crash box
4 Intermediate element
5 First wall of 4
6 Second wall of 4
7 End of 5
8 End of 6
9 First support wall
10 Second support wall
11 Concave side of 9
12 Concave side of 10
13 Back plate
14 First end of 3
15 Corrugations
16 Obstacle
17 Welded connection
18 Second end of 3

The invention claimed is:

1. A bumper system for a vehicle with a bumper beam and two crash boxes, as well as two intermediate elements, wherein intermediate elements have a first wall and a second wall that are arranged in such a way that, from the perspective of a direction x, the first wall faces forward of the vehicle and the second wall faces rearward of the vehicle, wherein the walls are linked to each other at their one end in direction y wherein the linked ends point toward the exterior of the vehicle, wherein the walls are also connected to at least a first support wall, wherein the intermediate elements are arranged in the bumper system, such that in the event of a force striking the bumper beam in direction x, the intermediate elements are deformed first and thereafter the crash box assigned to the intermediate element is subsequently deformed, wherein the intermediate elements are arranged between the crash boxes and back plates attached to the crash boxes, wherein the first wall is attached to the crash box, and the intermediate element is configured in a single piece and materially uniform with the back plate.

2. The bumper system according to claim 1, wherein the intermediate elements extend in a direction z such that several crash-management levels are connected to each other, specifically the intermediate elements of the support of a bumper beam is at least a further crash-management level.

3. The bumper system according to claim 1, wherein the first wall with a y-z plane involves an angle $\alpha_1$ from 0° to 20°.

4. The bumper system according to claim 1, wherein the second wall with a y-z plane involves an angle $\alpha_2$ from 0° to 20°.

5. The bumper system according to claim 1, wherein the first and second wall involve angle $\beta$ between 0° and 45°.

6. A bumper system for a vehicle with a bumper beam and two crash boxes, as well as two intermediate elements, wherein intermediate elements have a first wall and a second wall that are arranged in such a way that, from the perspective of a direction x, the first wall faces forward of the vehicle and the second wall faces rearward of the vehicle, wherein the walls are linked to each other at their one end in direction y wherein the linked ends point toward the exterior of the vehicle, wherein the walls are also connected to at least a first support wall, wherein the intermediate elements are arranged in the bumper system, such that in the event of a force striking the bumper beam in direction x, the intermediate elements are deformed first and thereafter the crash box assigned to the intermediate element is subsequently deformed wherein the second wall with a y-z plane involves an angle $\alpha_2$ from 0° to 20°, wherein the first and second wall involve angle $\beta$ between 0° and 45° wherein there is at least one support wall which has a curvature towards the exterior of the vehicle.

7. The bumper system according to claim 6, wherein the intermediate elements are arranged between the bumper beam and the crash boxes.

8. The bumper system according to claim 7, wherein the first wall is designed to adapt to the external contour of an adjacent wall of bumper beam.

9. The bumper system according to claim 1, wherein an end of the crash box adjacent to the intermediate element is connected to the adjacent wall of the intermediate element, so that the crash box and the intermediate element are part of the bumper system.

10. The bumper system according to claim 1, wherein the first support wall connects other ends of the first and the second walls to each other.

11. The bumper system according to claim 1, wherein there is at least one second support wall which is arranged between the first and the second walls.

12. The bumper system according to claim 1, wherein there is at least one support wall which has a curvature towards the exterior of the vehicle.

13. The bumper system according to claim 1, wherein the intermediate elements are arranged in a way that support walls on outer walls or inner walls of the crash boxes are designed for forming a continuous load path.

14. The bumper system according to claim 1, wherein the intermediate element is mechanically processed or locally reinforced.

15. The bumper system according to claim 1, wherein the bumper beam consists of a 6,000 or 7,000 aluminum alloy, and the intermediate elements and the crash boxes consist of comparatively softer material.

16. The bumper system according to claim 1, wherein the intermediate elements have a greater deformability than the crash boxes.

* * * * *